United States Patent
Yoon et al.

(10) Patent No.: US 11,139,529 B2
(45) Date of Patent: Oct. 5, 2021

(54) CYLINDRICAL BATTERY CELL ASSEMBLY WITH IMPROVED SPACE UTILIZATION AND SAFETY, AND BATTERY MODULE COMPRISING SAME

(71) Applicant: LG CHEM, LTD., Seoul (KR)

(72) Inventors: Ji-Su Yoon, Daejeon (KR); Su-Chang Kim, Daejeon (KR); Jae-Min Yoo, Daejeon (KR); Jae-Uk Ryu, Daejeon (KR); Dal-Mo Kang, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 69 days.

(21) Appl. No.: 16/619,407

(22) PCT Filed: Dec. 5, 2018

(86) PCT No.: PCT/KR2018/015342
§ 371 (c)(1),
(2) Date: Dec. 4, 2019

(87) PCT Pub. No.: WO2019/132291
PCT Pub. Date: Jul. 4, 2019

(65) Prior Publication Data
US 2020/0127249 A1    Apr. 23, 2020

(30) Foreign Application Priority Data
Dec. 26, 2017    (KR) .................. 10-2017-0179817

(51) Int. Cl.
*H01M 50/213*    (2021.01)
*H01M 50/502*    (2021.01)
(Continued)

(52) U.S. Cl.
CPC ....... *H01M 50/213* (2021.01); *H01M 10/613* (2015.04); *H01M 10/623* (2015.04);
(Continued)

(58) Field of Classification Search
CPC ............. H01M 50/213; H01M 50/503; H01M 50/469; H01M 10/0422; H01M 10/643; H01M 10/123; H01M 2/022; H01M 2/105
See application file for complete search history.

(56) References Cited

U.S. PATENT DOCUMENTS

| 9,054,367 B2 | 6/2015 | Song et al. | |
| 2009/0297892 A1* | 12/2009 | Ijaz | H01M 50/213 429/7 |

(Continued)

FOREIGN PATENT DOCUMENTS

| CN | 205609697 U | 9/2016 |
| EP | 2 787 556 A1 | 10/2014 |

(Continued)

OTHER PUBLICATIONS

Coman, Paul T., et al. "Numerical analysis of heat propagation in a battery pack using a novel technology for triggering thermal runaway." Applied Energy 203 (2017): 189-200. (Year: 2017).*

(Continued)

*Primary Examiner* — Maria Laios
*Assistant Examiner* — Grace Ann Kenlaw
(74) *Attorney, Agent, or Firm* — Birch, Stewart, Kolasch & Birch, LLP

(57) ABSTRACT

A cylindrical battery cell assembly which includes a plurality of cylindrical battery cells arranged so that the cylindrical battery cells having the same polarity face in the same direction, a cell holder configured to confine the cylindrical battery cells as a bundle unit, a first electrode connection member located at an upper portion of the cell holder and a second electrode connection member located at the bottom ends of the cylindrical battery cells. The second electrode connection member includes a second connection portion located at a lower portion of the cell holder and disposed to (Continued)

contact the second electrode terminals. A rod-shaped second terminal portion extends vertically from the second connection portion through an empty space formed inside the cell holder so that one end of the rod-shaped second terminal portion is disposed above the cell holder.

16 Claims, 7 Drawing Sheets

(51) Int. Cl.
    *H01M 10/613*     (2014.01)
    *H01M 10/643*     (2014.01)
    *H01M 10/6551*     (2014.01)
    *H01M 10/655*     (2014.01)
    *H01M 10/623*     (2014.01)

(52) U.S. Cl.
    CPC ..... *H01M 10/643* (2015.04); *H01M 10/6551* (2015.04); *H01M 50/502* (2021.01); *H01M 2220/30* (2013.01)

(56) References Cited

U.S. PATENT DOCUMENTS

| | | |
|---|---|---|
| 2013/0082859 A1 | 4/2013 | Kano |
| 2014/0322581 A1 | 10/2014 | Rüter et al. |
| 2015/0255225 A1 | 9/2015 | Kusaba et al. |
| 2015/0349314 A1 | 12/2015 | Yasui et al. |
| 2016/0172642 A1 | 6/2016 | Hughes et al. |
| 2017/0098806 A1 | 4/2017 | Bowersock et al. |
| 2017/0187012 A1 | 6/2017 | Cho |

FOREIGN PATENT DOCUMENTS

| | | | |
|---|---|---|---|
| EP | 2787556 A1 * | 10/2014 | ............ H01M 50/20 |
| JP | 3-176968 A | 7/1991 | |
| JP | 2003-217560 A | 7/2003 | |
| JP | 2011-521403 A | 7/2011 | |
| JP | 2013-30382 A | 2/2013 | |
| JP | 5241182 B2 | 7/2013 | |
| JP | 2014-170613 A | 9/2014 | |
| JP | 5803513 B2 | 11/2015 | |
| JP | WO2014/083600 A1 | 1/2017 | |
| JP | 2018-37181 A | 3/2018 | |
| KR | 10-2016-0079220 A | 7/2016 | |
| KR | 10-2017-0005117 A | 1/2017 | |
| KR | 10-2017-0078015 A | 7/2017 | |
| KR | 10-2017-0093956 A | 8/2017 | |
| WO | WO 2012/154837 A1 | 12/2012 | |
| WO | WO 2014/109284 A1 | 7/2014 | |

OTHER PUBLICATIONS

International Search Report for PCT/KR2018/015342 dated Mar. 19, 2019.

European Search Report issued in European Patent Application No. 18 89 4711, dated Sep. 25, 2020.

\* cited by examiner

CONVENTIONAL ART

CYLINDRICAL BATTERY CELL ASSEMBLY WITH IMPROVED SPACE UTILIZATION AND SAFETY, AND BATTERY MODULE COMPRISING SAME

TECHNICAL FIELD

The present disclosure relates to a cylindrical battery cell assembly and a battery module including the cylindrical battery cell assembly, and more particularly, to a cell assembly having a group of cylindrical battery cells with high space efficiency and adopting a serial ignition prevention structure, and a battery module including the cylindrical battery cell assembly.

The present application claims priority to Korean Patent Application No. 10-2017-0179817 filed on Dec. 26, 2017 in the Republic of Korea, the disclosures of which are incorporated herein by reference.

BACKGROUND ART

As technology development and demand for mobile devices have increased, the demand for secondary batteries as energy sources has been rapidly increasing. Conventionally, nickel cadmium batteries or hydrogen ion batteries have been used as secondary batteries. However, recently, lithium secondary batteries have been highly spotlighted due to substantially no memory effect to ensure free charging and discharging, very low self-discharge rate and high energy density, compared to nickel-based secondary batteries.

The lithium secondary battery mainly uses a lithium-based oxide and a carbonaceous material as a positive electrode active material and a negative electrode active material, respectively. The lithium secondary battery includes a secondary battery cell in which a positive electrode plate coated with a positive electrode active material and a negative electrode plate coated with a negative electrode active material are disposed with a separator being interposed therebetween, and an exterior, namely a battery case, for hermetically accommodating the secondary battery cell along with an electrolyte.

Generally, the lithium secondary battery may be classified into a can-type secondary battery and a pouch-type secondary battery depending on the shape of an exterior that accommodates the electrode assembly. Also, the can-type secondary battery may be classified into a cylindrical secondary battery and a rectangular secondary battery. Recently, when a middle-sized or large-sized battery module or pack is configured, the pouch-type secondary battery or the cylindrical secondary battery is used most frequently.

The pouch-type secondary battery is easy to assemble and has a high energy density, but is vulnerable to external shock because of low mechanical rigidity. Meanwhile, the cylindrical secondary battery is excellent in durability against external impact due to excellent mechanical rigidity, but is not easily assembled intensively in a limited space.

FIG. 1 is an exploded perspective view showing a conventional battery module having cylindrical secondary batteries.

As shown in FIG. 1, a large number of cylindrical secondary batteries 1 are required to meet the required output voltage and charge/discharge capacity, and a frame is used to fix the cylindrical secondary batteries. For example, the cylindrical secondary batteries 1 may be mounted and fixed between a top frame 2 and a bottom frame 3, which are provided to be coupled up and down. In addition, since the cylindrical secondary batteries have electrode terminals at top and bottom ends thereof, bus bars or metal plates 4, 5 are mounted to the top and bottom ends, respectively, so that the cylindrical secondary batteries may be connected in series and/or in parallel by the bus bars or the metal plates.

However, in the conventional battery module, since the frames and the bus bars are all located in both the upper and lower spaces of the cylindrical secondary batteries, the degree of freedom in space is low when a cooling device or electrical connecting parts are additionally installed.

Also, since the bus bars are located separately in the top and bottom spaces in order to connect the cylindrical secondary batteries in series and/or in parallel, the cylindrical secondary batteries should be arranged so that some cylindrical secondary batteries have positive electrode terminals facing upwards and some cylindrical secondary batteries have negative electrode terminals facing upward. Otherwise, a complicated conductor pattern should be provided on the top bus bar and the bottom bus bar, and the top bus bar and the bottom bus bar should be connected using separate components.

In addition, the number of required cylindrical secondary batteries depends on the capacity and the output of the battery module. However, if the frame for integrally fixing the cylindrical secondary batteries is used as in the conventional art, the frame need to be newly designed whenever the capacity of the battery module is changed.

Meanwhile, the cylindrical secondary battery recently has a function of preventing ignition and explosion by interrupting the current and eliminating the internal pressure during abnormal operation of the battery by using a current interruptive device (CID) mounted therein. However, since a large number of cylindrical secondary batteries are densely arranged in the battery module, if any one of the cylindrical secondary batteries is ignited or exploded if the current interruptive device does not operate properly, other cylindrical secondary batteries may also be ignited or exploded. Nevertheless, the conventional battery module does not have any suitable means for preventing this problem.

DISCLOSURE

Technical Problem

The present disclosure is designed to solve the problems of the related art, and therefore the present disclosure is directed to providing a cylindrical battery cell assembly, which has a space-efficient electrical connection structure and a chain ignition preventor and may be manufactured as a bundle unit having a specific capacity.

Also, the present disclosure is directed to providing a battery module, which may have various sizes and capacities by selectively combining the number of cylindrical battery cell assemblies and connecting them in series or in parallel.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a cylindrical battery cell assembly, comprising: a plurality of cylindrical battery cells each cylindrical battery cell having a first electrode terminal formed at a top end and a second electrode terminal at a bottom end thereof and arranged to stand up so that the electrode terminals having a same polarity face in the same direction; a cell holder configured to confine the plurality of cylindrical battery cells as a bundle unit; a first electrode connection member located at an upper portion of the cell holder to electrically connect the first electrode terminals; and a second electrode connection member configured to electrically connect the second electrode terminals, wherein the second electrode connection member includes: a second connection portion located at a lower portion of the cell holder and disposed to contact the second electrode terminals; and a rod-shaped second terminal portion extending vertically from the second connection portion through an empty space formed inside the cell holder so that a first end of the rod-shaped second terminal portion is disposed above the cell holder.

The cell holder may include unit cell body covers, each unit cell cover having a cylindrical shape so that the plurality of cylindrical battery cells are inserted therein, respectively, and the unit cell body covers may be arranged in a triangular shape so that circumferential surfaces of neighboring unit cell body covers are attached to each other.

The unit cell body covers may be provided so that at least three unit cell body covers are integrated, and the empty space is a region surrounded by the at least three unit cell body covers that are in contact with each other.

The cell holder may further include a cell top cover having first electrode holes for exposing only the first electrode terminals of the plurality of cylindrical battery cells to the outside and provided to be mountable to top ends of the unit cell body covers.

The unit cell body covers may be shorter than the plurality of cylindrical battery cells so that the plurality of cylindrical battery cells are exposed below the unit cell body covers.

The cell top cover may further have a second terminal hole through which the first end of the rod-shaped second terminal portion passes.

The cell holder may be made of mica or synthetic mica.

The first electrode connection member may include first connection portions having a size corresponding to the first electrode holes and respectively fitted into the first electrode holes to contact the first electrode terminals; a conductor pattern configured to electrically connect the first connection portions; and a first terminal portion having one end protruding on the conductor pattern to the same height as the rod-shaped second terminal portion.

In another aspect of the present disclosure, there is also provided a battery module, comprising the plurality of cylindrical battery cell assemblies described above.

In the battery module, the cylindrical battery cell assemblies may be arranged in a triangular shape when being viewed from above and closely arranged successively so that neighboring cylindrical battery cell assemblies are in a reversed form.

The battery module may further comprise an insulation plate having insert holes formed at predetermined positions so that one ends of the first terminal portions and the rod-shaped second terminal portions are inserted therein, the insulation plate being configured to cover an upper portion of the cylindrical cell assemblies; and bus bars configured to selectively connect the first terminal portions and the rod-shaped second terminal portions.

The battery module may further comprise a heatsink located at a lower portion of the plurality of cylindrical battery cell assemblies to absorb heat of the cylindrical battery cells; and a heat dissipation pad interposed between the cylindrical battery cell assemblies and the heatsink, wherein the heat dissipation pad has an engagement portion provided at an upper surface thereof to be engaged with a bottom portion of the cylindrical battery cell assembly.

In another aspect of the present disclosure, there is also provided a battery pack, comprising at least one battery module described above.

Advantageous Effects

According to an embodiment of the present disclosure, it is possible to provide a cylindrical battery cell assembly, which has a space-efficient electrical connection structure and includes cylindrical battery cells having a specific capacity as a bundle unit.

In addition, by using a cell holder made of mica material having excellent insulation performance, it is possible to prevent the chain ignition of the cylindrical battery cells, thereby enhancing safety.

According to another embodiment of the present disclosure, it is possible to manufacture a battery module in various sizes and capacities by selectively combining the cylindrical battery cell assemblies and connecting them in series and/or in parallel.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only and not intended to limit the scope of the disclosure, so it should be understood that other equivalents and modifications could be made thereto without departing from the scope of the disclosure.

Figure 1:
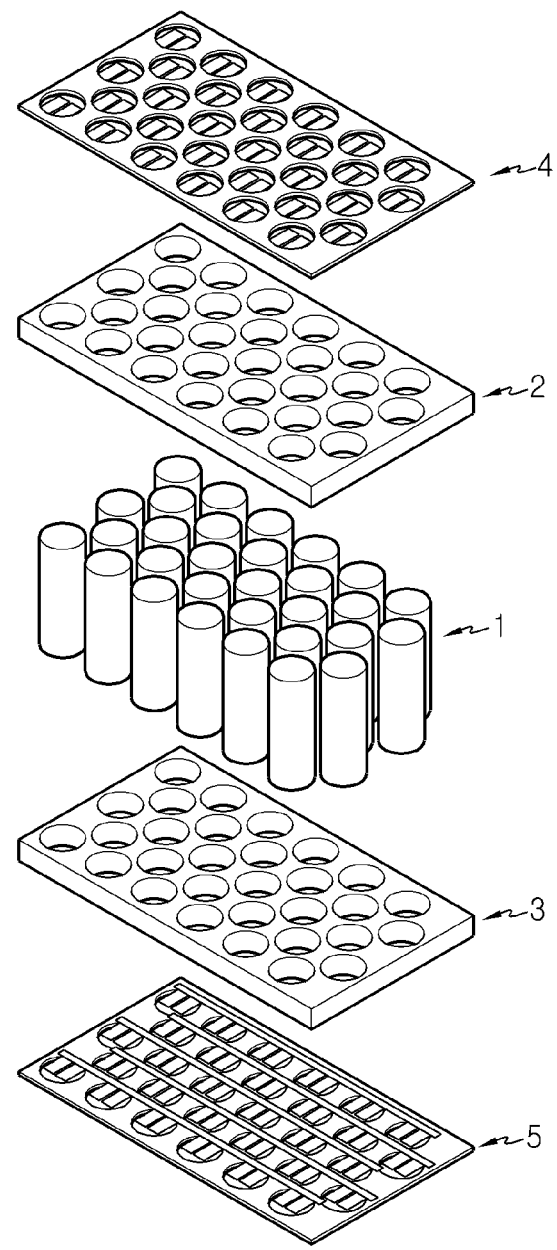
FIG. 1 is a schematic exploded perspective view showing a conventional battery module having cylindrical secondary batteries.
Figure 2:
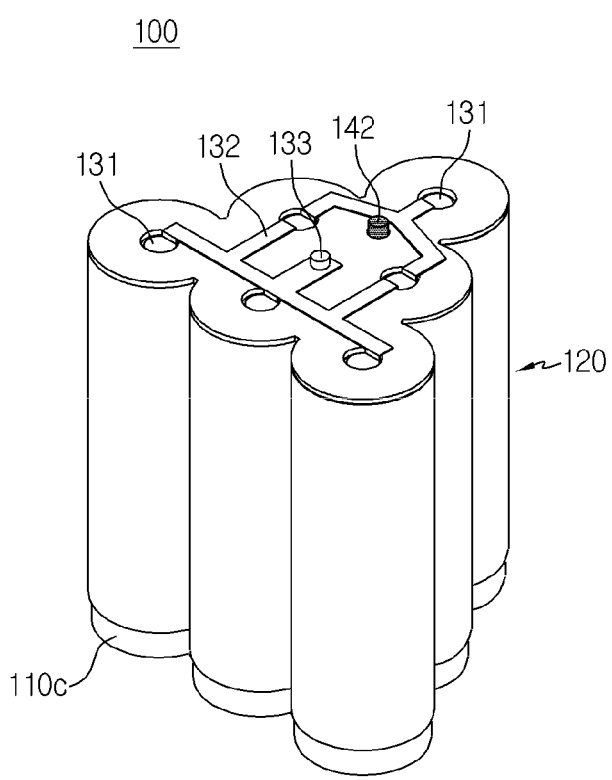
FIG. 2 is a perspective view showing a cylindrical battery cell assembly according to an embodiment of the present disclosure.
Figure 3:
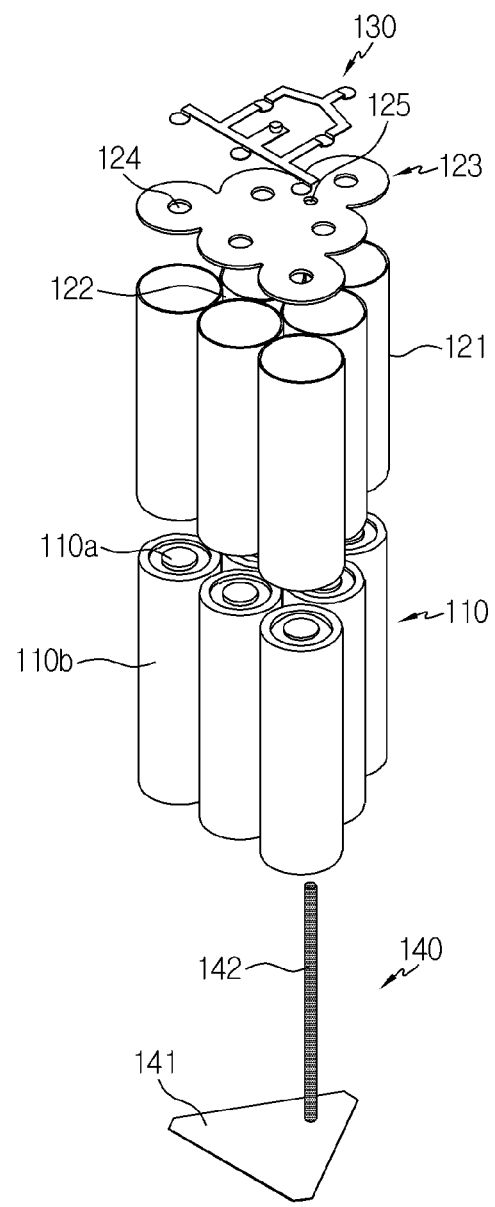
FIG. 3 is an exploded perspective view showing the cylindrical battery cell assembly of FIG. 2.

FIG. 2 is a perspective view showing a cylindrical battery cell assembly according to an embodiment of the present disclosure, and FIG. 3 is an exploded perspective view showing the cylindrical battery cell assembly of FIG. 2.

Referring to FIGS. 2 and 3, a cylindrical battery cell assembly 100 according to the present disclosure includes a plurality of cylindrical battery cells 110, a cell holder 120, a first electrode connection member 130, and a second electrode connection member 140.

The cylindrical battery cell 110 is a kind of can-type secondary battery in which an electrode assembly is embedded in a metal can. The metal can may be made of a lightweight conductive metal such as aluminum, stainless steel or alloys thereof.

The cylindrical battery cell 110 may include a cylindrical battery can 110b, a jelly-roll type electrode assembly accommodated inside the battery can 110b, and a top cap 110a coupled to an upper portion of the battery can 110b. The top cap 110a may be connected to a positive electrode plate of the electrode assembly to serve as a positive electrode terminal, and a bottom end of the battery can 110b may be connected to a negative electrode plate of the electrode assembly to serve as a negative electrode terminal. Thus, the electrode terminals are formed at the top and bottom ends of the cylindrical battery cell 110, respectively.

In the present disclosure, the cylindrical battery cells 110 may be disposed to stand up so that the cylindrical battery cells having the same polarity face in the same direction. For example, the cylindrical battery cells 110 may all be arranged uniformly to face in one direction so that all positive electrode faces upward and all negative electrode faces downward.

The arrangement of the cylindrical battery cells 110 according to an embodiment of the present disclosure may have a triangular form when being viewed from above. In this case, the cylindrical battery cell assembly 100 may include at least three unit cylindrical battery cells 110. In this figure, six cylindrical battery cells 110 are arranged in a triangular form in total of, but more cylindrical battery cells 110, for example ten or fifteen cylindrical battery cells 110, may also be arranged in a triangular form.

Meanwhile, the scope of the present disclosure does not necessarily have to be limited to cylindrical battery cells 110 arranged in a triangular configuration. The triangular structure is disclosed as a preferred example, and as an alternative embodiment, the cylindrical battery cells 110 may be arranged in a rectangular or circular configuration when viewed from the top.

The cell holder 120 is a component for accommodating and fixing the cylindrical battery cells 110 as a bundle unit and preventing the chain explosion of the cylindrical battery cells 110.

As shown in FIGS. 2 and 3, the cell holder 120 of this embodiment includes unit cell body covers 121 and a cell top cover 123.

The unit cell body covers 121 have a cylindrical shape and may be respectively coupled to the cylindrical battery cells 110 by fitting in a one-to-one relationship. In addition, the unit cell body covers 121 may be integrally formed in a triangular form so that circumferential surfaces of neighboring unit cell body covers 121 are attached to each other. That is, the unit cell body covers 121 may be designed to be suitable for the arrangement of the cylindrical battery cells 110.

For example, in this embodiment, six unit cell body covers 121 are provided as a single body to form a triangular form so that their circumferential surfaces are in contact with each other. The six cylindrical battery cells 110 may be inserted into the unit cell body covers 121. In this case, the six cylindrical battery cells 110 are confined in the unit cell body covers 121 to maintain the triangular form.

The unit cell body cover 121 may be made of mica or synthetic mica. In this case, the unit cell body cover 121 may have sufficient heat resistance and electrical insulation. Thus, since the bodies of the six cylindrical battery cells 110 are covered by the unit cell body covers 121, even if any one of the cylindrical battery cells 110 is ignited or exploded, other cylindrical battery cells 110 may be protected, thereby preventing a chain ignition.

The cell top cover 123 covers top ends of the cylindrical battery cells 110, namely the top cap region and may be made of mica or synthetic mica, similar to the unit cell body cover 121. In this embodiment, the cell top cover 123 and the unit cell body cover 121 are separately manufactured and then mutually coupled by a clinching method for individual part production and assembly convenience. However, the cell top cover 123 and the unit cell body cover 121 may also be integrally manufactured.

If gas is generated in the cylindrical battery cell 110 to abruptly increase the internal pressure, the top cap region 110a is likely to break first, and thus the flame is more likely to leak through the top end of the cylindrical battery cell 110 rather than the bottom end thereof. Thus, the unit cell body 110a and the top end of the cylindrical battery cells 110 are covered with the unit cell body cover 121 and cell top cover 123 to prevent the flame from propagating in an emergency. Meanwhile, since the lower portion of the cylindrical battery cells 110 is relatively unlikely to have a flame leakage, the lower portion is exposed to the outside and used as an area for cooling.

For this, the unit cell body covers 121 are formed to be slightly shorter than the cylindrical battery cells 110. In this case, as shown in FIG. 2, only the bottom portion 110c of the cylindrical battery cells 110 may be slightly exposed below the unit cell body covers 121, and the remaining portion may be covered by the cell holder 120.

Subsequently, the electrical connection structure of the cylindrical battery cell assembly 100 according to the first electrode connection member 130 and the second electrode connection member 140 will be described in detail with reference to FIGS. 2 to 5.

The first electrode connection member 130 according to the present disclosure is located at an upper portion of the unit cell holder 120 to electrically connect first electrode terminals respectively located at the top ends of the cylindrical battery cells 110, and the second electrode connection member 140 electrically connects second electrode terminals respectively located at the bottom ends of the cylindrical battery cells 110.

In this embodiment, since the cylindrical battery cells 110 stands upright so that all positive electrode terminals face upward, the positive electrode terminals correspond to the first electrode terminals and the negative electrode terminals correspond to the second electrode terminals. However, if the cylindrical battery cells 110 stands inversely so that all positive electrode terminals face downward, the negative electrode terminals may serve as the first electrode terminals and the positive electrode terminals may serve as the second electrode terminals. Hereinafter, for convenience of explanation, the first electrode means a positive electrode and the second electrode means a negative electrode.

The first electrode connection member 130 includes a first connection portion 131, a conductor pattern 132, and a first terminal portion 133.

The first connection portion 131 is a portion that contacts the positive electrode of each cylindrical battery cell 110, namely a portion contacting the protruding region of the top cap 110a. For example, the first connection portion 131 may be attached to the top cap 110a by welding. The cell top cover 123 further has first electrode holes 124, and the positive electrode terminals of the cylindrical battery cells 110 are respectively positioned below the first electrode holes 124. The first connection portion 131 may be formed in a size corresponding to the first electrode hole 124 and may be welded in a state of being inserted into the first electrode hole 124 to contact the positive electrode.

The conductor pattern 132 is in the form of a thin metal plate intersecting in a plurality of directions and may be provided to electrically connect the first connection portions 131. For example, in this embodiment, six first connection portions 131 in total may contact the positive electrode terminals of six cylindrical battery cells 110, and the six first connection portions 131 may be electrically connected with each other by the conductor pattern 132.

In addition, the first terminal portion 133 serves as a positive electrode terminal of the cylindrical battery cells 110 and may have a predetermined thickness on the conductor pattern 132 to protrude upward, opposite to the first connection portion 131. For example, the first terminal portion 133 may extend on the conductor pattern 132 to the same height as one end of a rod-shaped second terminal portion 142, explained later.

Next, as shown in FIG. 3, the second electrode connection member 140 includes a second connection portion 141 and a rod-shaped second terminal portion 142.

The second connection portion 141 is located at a lower portion of the cell holder 120 and may have a plate form with an area capable of contacting all of the negative electrode terminals of the cylindrical battery cells 110, respectively.

The second connection portion 141 of this embodiment is provided in the form of a triangular plate where the bottom centers of the cylindrical battery cells 110 are located at three vertex regions. The second connection portion 141 in the form of a triangular plate may electrically connect the cylindrical battery cells 110 placed thereon and simultaneously support the cylindrical battery cells 110 integrally.

For example, the second connection portion 141 in the form of a triangular plate may be attached to the lower surface of the cylindrical battery cells 110 through a spot welding process. Here, the spot welding may be performed at six places where the negative electrode portions of the cylindrical battery cells 110 are respectively in contact with the second connection portion 141.

The rod-shaped second terminal portion 142 extends vertically from the second connection portion 141 through an empty space 122 formed inside the cell holder 120 so that one end of the rod-shaped second terminal portion 142 is disposed on the cell holder 120.

Figure 4:
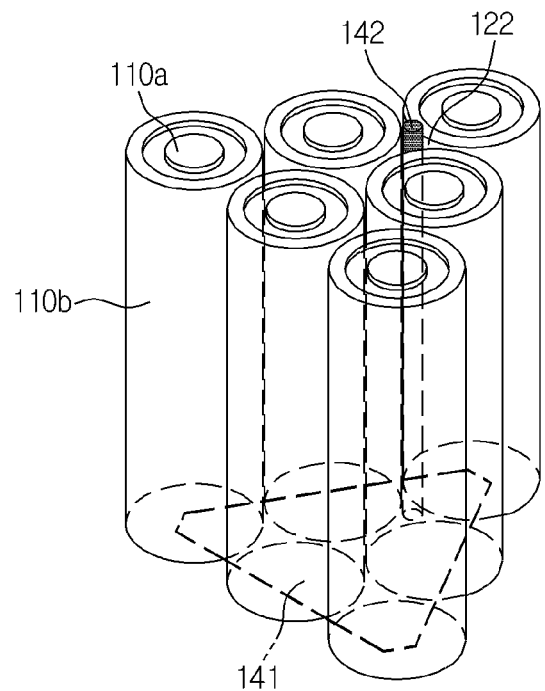
FIGS. 4 and 5 are a perspective view and a top view for illustrating the arrangement of a second connection member according to an embodiment of the present disclosure.
Figure 5:
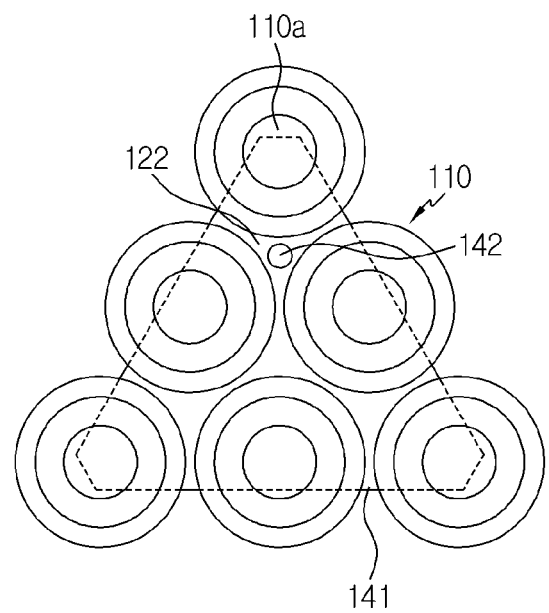

More specifically, referring to FIGS. 4 and 5, since the unit cell body covers 121 according to the present disclosure have a cylindrical shape and are arranged in a triangular form so that their circumferential surfaces are in contact with each other, it may be found that the empty space 122 is inevitably formed at the inner region of the unit cell body covers 121. That is, the empty space 122 may be specified as an area surrounded by at least three unit cell body covers 121 whose circumferential surfaces are in contact with each other. The rod-shaped second terminal portion 142 has a cylindrical shape, for example, to be inserted into the empty space 122, and is disposed inside the unit cell body covers 121. In addition, the cell top cover 123 further has a second terminal hole 125, one end of the rod-shaped second terminal portion 142 may be exposed above the cell top cover 123 through the second terminal hole 125. At this time, the rod-shaped second terminal portion 142 may extend to the same height as the first terminal portion 133 described above.

Since the rod-shaped second terminal portion 142 is disposed in the empty space inside the cell holder 120 as described above, the cylindrical battery cell assembly 100 may be prepared in a more compact design, and its peripheral space may be utilized more efficiently and more freely.

Also, the rod-shaped second terminal portion 142 may be disposed on the cell top cover 123 at the same height as the first terminal portion 133 to be adjacent thereto to function as a negative electrode terminal of the cylindrical battery cell assembly 100. In other words, the first terminal portion 133 may be specified as a positive electrode terminal, and the rod-shaped second terminal portion 142 may be specified as a negative electrode terminal. Since the positive electrode terminal and the negative electrode terminal are positioned adjacent to each other in the same direction in the cylindrical battery cell assembly 100 according to the present disclosure, the positive electrode terminal and the negative electrode terminal may be electrically connected to other components very simply.

According to the present disclosure as described above, it is possible to provide the cylindrical battery cell assembly 100 including the cylindrical battery cells 110 having a predetermined capacity and connected in parallel. If the cylindrical battery cell assemblies 100 are used, the battery module 10 may be manufactured in various shapes and sizes while ensuring simple electric connection.

Hereinafter, the battery module 10 including the cylindrical battery cell assemblies 100 described above as one component will be described with reference to FIGS. 6 to 9.

Referring to FIGS. 6 to 9, the battery module 10 according to the present disclosure may include cylindrical battery cell assemblies 100, an insulation plate 200 covering an upper portion of the cylindrical battery cell assemblies 100, bus bars 300 for electrically connecting the cylindrical battery cell assemblies 100, and a heat dissipation pad 400 and a heatsink 500 for cooling the cylindrical battery cell assemblies 100.

The number of cylindrical battery cell assemblies 100 may be predetermined according to the capacity and the output required for the battery module 10, and the cylindrical battery cell assemblies 100 may be closely adhered to each other successively inside the battery module 10.

Figure 6:
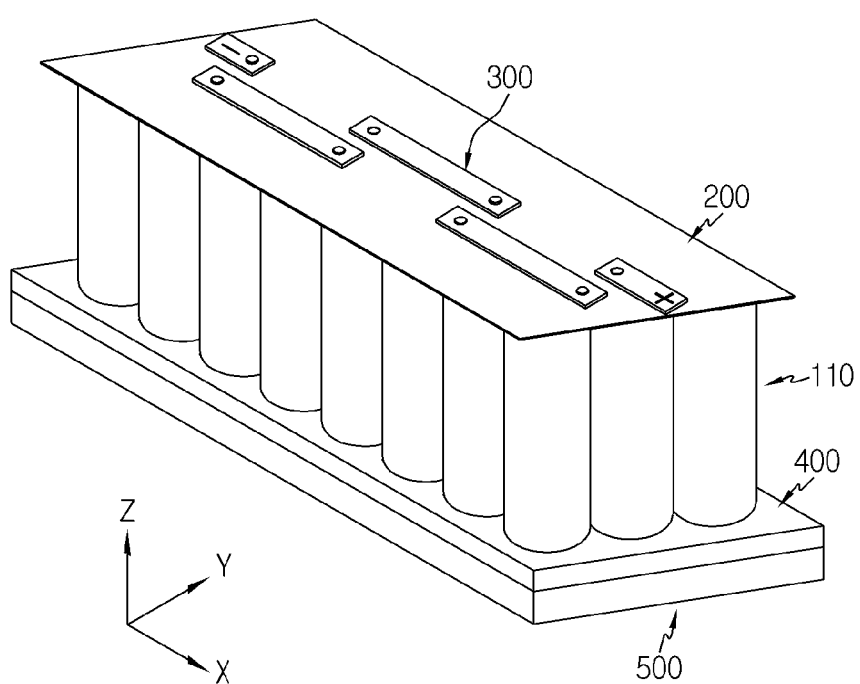
FIG. 6 is a perspective view showing a main configuration of a battery module according to an embodiment of the present disclosure.
Figure 7:
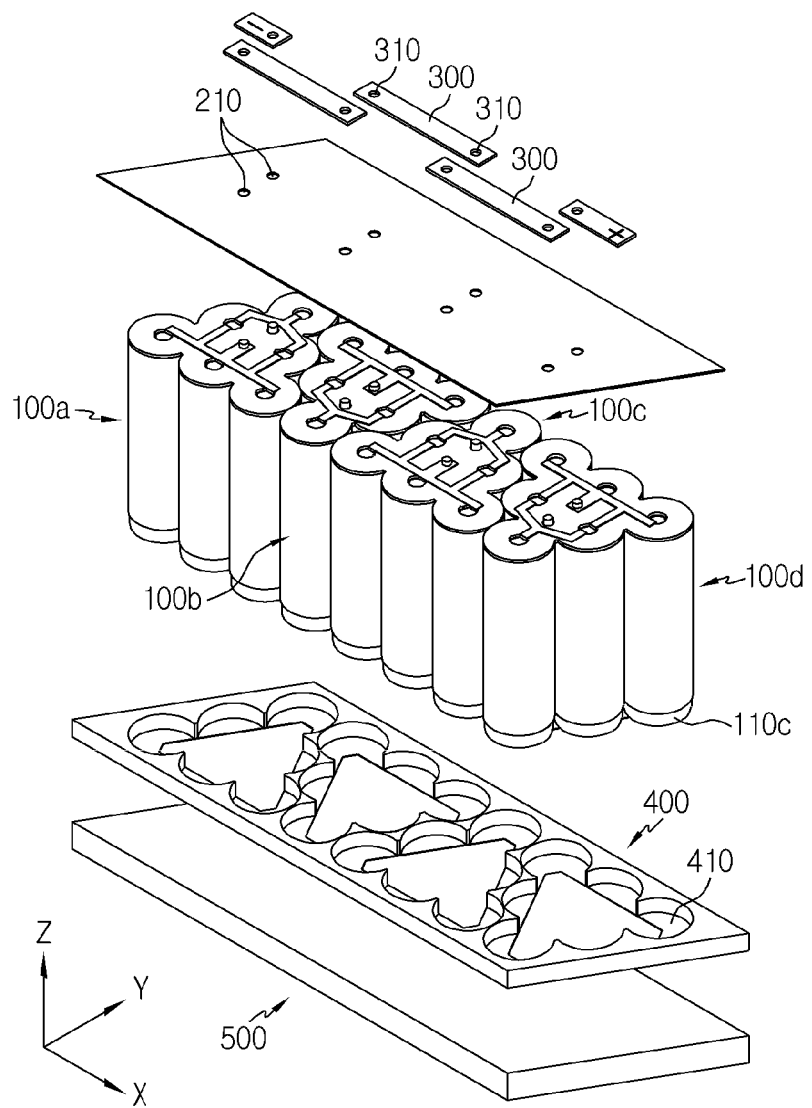
FIG. 7 is an exploded perspective view showing the battery module of FIG. 6.

For example, as shown in FIGS. 6 and 7, four cylindrical battery cell assemblies 100a, 100b, 100c, 100d may be successively arranged in close contact with each other in the X-axis direction. In this embodiment, the cylindrical battery cell assemblies 100 are arranged in a triangular form when being viewed from the above, and one cylindrical battery cell assembly 100 may closely contact another neighboring cylindrical battery cell assembly 100 in a symmetric or reverse pattern, successively. Here, an additional cylindrical battery cell assembly 100 may be successively provided in the X-axis direction, or in the X-axis direction and in the Y-axis direction, in the same pattern as this embodiment so that the battery module 10 may have various shapes and sizes.

Figure 8:
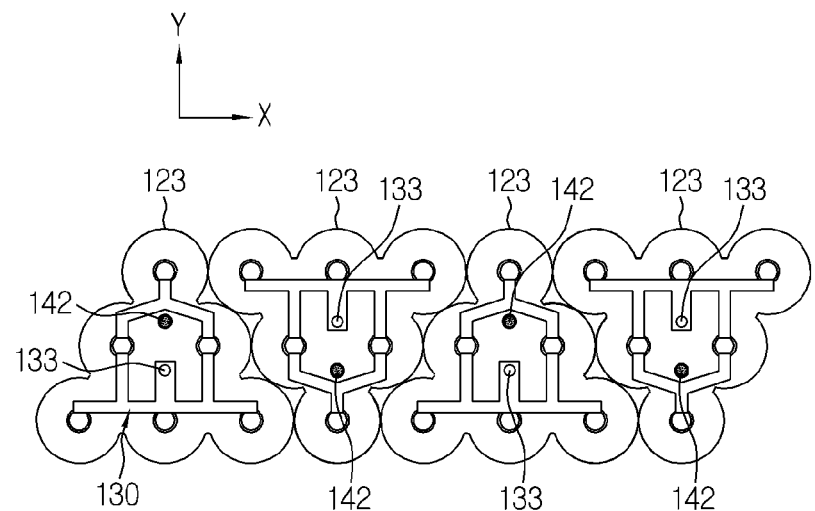
FIG. 8 is a top view showing the cylindrical battery cells of FIG. 6.
Figure 9:
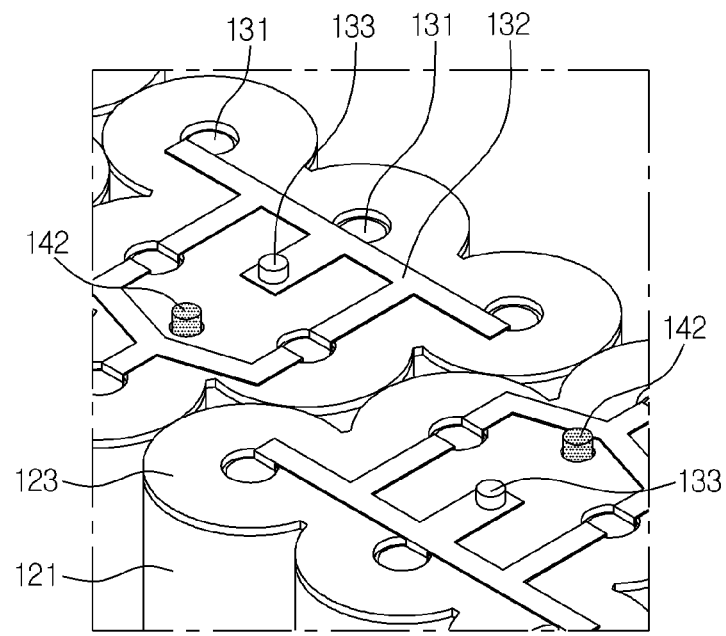
FIG. 9 is a partially enlarged perspective view of FIG. 8.

More specifically, referring to FIGS. 8 and 9, since the cylindrical battery cell assemblies 100 are arranged so that neighboring cylindrical battery cell assemblies 100 have reversed shapes, the positive electrode terminals 133 and the negative electrode terminals 142 of the neighboring cylindrical battery cell assemblies 100 are also disposed reversely with respect to each other. Thus, in the four cylindrical battery cell assemblies 100, the positive electrode terminals 133 and the negative electrode terminals 142 are alternately arranged in two rows along the X-axis direction. In this case, if the cylindrical battery cell assemblies 100 are connected in series, the bus bars 300 may be mounted in a simple pattern.

The insulation plate 200 is made of, for example, a material with excellent insulation and heat resistance such as mica and may have a plate form with an area capable of covering the upper portion of the cylindrical battery cell assembly 100. The insulation plate 200 has insert holes 210 formed at predetermined positions.

When the insulation plate 200 is attached to the top end of the cylindrical battery cell assemblies 100, the positive electrode terminals 133 and the negative electrode terminals 142 of the cylindrical battery cell assemblies 100 are inserted into the insertion holes 210 of the insulation plate 200 and exposed above the insulation plate 200. One ends of the positive electrode terminals 133 and the negative electrode terminals 142 exposed above the insulation plate 200 may be welded to the bus bar 300 in a state of being interposed in the terminal connection holes 310 provided at both ends of the bus bar 300.

Referring to FIGS. 7 and 8 again, four cylindrical battery cell assemblies 100 may be arranged such that the positive electrode terminals 133 and the negative electrode terminals 142 are alternately arranged in two rows along the X-axis direction. In addition, a bus bar 300 may be connected to the negative electrode terminal 142 of the second cylindrical battery cell assembly 100b adjacent to the positive electrode terminal 133 of the first cylindrical battery cell assembly 100a in the X-axis direction and be connected to the negative electrode terminal 142 of the third cylindrical battery cell assembly 100c adjacent to the positive electrode terminal 133 of the second cylindrical battery cell assembly 100b in the X-axis direction. Similarly, a bus bar 300 may be connected to the positive electrode terminal 133 of the third cylindrical battery cell assembly 100c and the negative electrode terminal 142 of the fourth cylindrical battery cell assembly 100d.

For convenience, it is disclosed in this embodiment that only four cylindrical battery cell assemblies 100a, 100b, 100c, 100d are connected in series. However, it is also possible that the four cylindrical battery cell assemblies 100a, 100b, 100c, 100d are connected in series and in parallel by using a bent bus bar 300 instead of the straight bus bar 300 or by adjusting the connection position of the bus bar 300. Thus, according to this configuration, the serial and parallel connections of the battery module 10 are entirely made at the upper side, thereby improving the insulation and the convenience in electrical connection.

For reference, the positions of the positive electrode terminal 133 and the negative electrode terminal 142 exposed above the cell top cover 123 may be changed as desired in each cylindrical battery cell assembly 100. For example, if two kinds of cylindrical battery cell assemblies 100 having positive electrode terminals 133 and negative electrode terminals 142 located at opposite sides based on the Y-axis direction are used, even though the two kinds of cylindrical battery cell assemblies 100 are arranged so that neighboring cylindrical battery cell assemblies 100 have reverse shapes, the positive electrode terminals 133 and the negative electrode terminals 142 of the cylindrical battery cell assemblies 100 are not arranged reversely with respect to each other. In this case, since the cylindrical battery cell assemblies 100 having the same polarity are arranged on a line extending in the X-axis direction, the bus bar 300 having a straight form may be used as it is for parallel connection, which makes it easier to mount the bus bar 300.

Meanwhile, the bottom portion 110c of the cylindrical battery cell assembly 100, namely the bottom portions 110c of the cylindrical battery cells 110, may be utilized as an area for cooling.

In the battery module 10 of this embodiment, the heatsink 500 is disposed at the lower portion of the cylindrical battery cell assembly 100 so that the heat generated from the cylindrical battery cells 110 are emitted to the outside through the heatsink 500. For example, the heatsink 500 may be a component that allows a coolant to pass through a flow path therein so that the cylindrical battery cells 110 are indirectly cooled by absorbing the heat of the cylindrical battery cells 110 by means of thermal contact.

Also, the heat dissipation pad 400 may be further interposed between the cylindrical battery cell assemblies 100 and the heatsink 500. The heat dissipation pad 400 may further have an engagement portion 410 formed at an upper surface thereof to be engaged with the bottom portion of the cylindrical battery cell assembly 100 so as to enhance the adhering force. In the cylindrical battery cell assemblies, the bottom portion 110c of the cylindrical battery cells exposed below the cell holder 120 may be inserted into the engagement portion 410 to be engaged therewith.

If the heat dissipation pad 400 is used, an air layer created by the difference in surface roughness between the cylindrical battery cells 110 and the heatsink 500 may be eliminated, it is possible to improve the heat transfer efficiency and more securely fix the cylindrical battery cell assemblies 100.

According to the present disclosure described above, it is possible to provide the battery module 10, which has a space-efficient electric connection structure and is safe since it is possible to prevent the occurrence of chain firing of the neighboring cylindrical battery cells 110 even though any one of the cylindrical battery cells 110 is ignited. In addition, the number of the cylindrical battery cell assemblies 100 may be increased or decreased to manufacture the battery module 10 in various sizes and capacities.

A battery pack according to the present disclosure may include at least one battery modules 10 of the present disclosure. In addition to the battery module 10, the battery pack according to the present disclosure may further include a pack case for accommodating the battery module 10, and various devices for controlling charge and discharge of the battery module 10 such as a battery management system (BMS), a current sensor, a fuse or the like.

Meanwhile, when the terms indicating up, down, left, right, front and rear directions are used in the specification, it is obvious to those skilled in the art that these merely represent relative locations for convenience in explanation and may vary based on a location of an observer or an object to be observed.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A cylindrical battery cell assembly, comprising:
a plurality of cylindrical battery cells, each cylindrical battery cell having a first electrode terminal formed at a top end and a second electrode terminal formed at a bottom end thereof and arranged to stand up so that the electrode terminal having a same polarity face in a same direction;
a cell holder configured to confine the plurality of cylindrical battery cells as a bundle unit;
a first electrode connection member located at an upper portion of the cell holder to electrically connect the first electrode terminals; and
a second electrode connection member configured to electrically connect the second electrode terminals,
wherein the second electrode connection member includes:
a second connection portion located at a lower portion of the cell holder and disposed to contact the second electrode terminals; and
a rod-shaped second terminal portion extending vertically from the second connection portion through an empty space formed inside the cell holder so that a first end of the rod-shaped second terminal portion is disposed above the cell holder,
wherein the empty space is a region surrounded by at least three cylindrical battery cells of the plurality of cylindrical battery cells, each of the at least three cylindrical battery cells contacting the other two of the at least three cylindrical battery cells, and
wherein the empty space is spaced inwardly from a perimeter of the plurality of cylindrical battery cells.

2. The cylindrical battery cell assembly according to claim 1, wherein the cell holder includes unit cell body covers, each unit cell cover having a cylindrical shape so that the plurality of cylindrical battery cells are inserted therein, respectively, and
wherein the cell holder is a triangular shape so that circumferential surfaces of neighboring unit cell body covers are attached to each other.

3. The cylindrical battery cell assembly according to claim 2, wherein the unit cell body covers are provided so that at least three unit cell body covers are integrated, and the empty space is a region surrounded by the at least three unit cell body covers that are integrated.

4. The cylindrical battery cell assembly according to claim 2, wherein the cell holder further includes a cell top cover having first electrode holes for exposing only the first electrode terminals of the plurality of cylindrical battery cells to the outside and provided to be mountable to top ends of the unit cell body covers.

5. The cylindrical battery cell assembly according to claim 4, wherein the unit cell body covers are shorter than the plurality of cylindrical battery cells so that the plurality of cylindrical battery cells are exposed below the unit cell body covers.

6. The cylindrical battery cell assembly according to claim 4, wherein the cell top cover further has a second terminal hole through which the first end of the rod-shaped second terminal portion passes.

7. The cylindrical battery cell assembly according to claim 4, wherein the cell holder is made of mica or synthetic mica.

8. The cylindrical battery cell assembly according to claim 4, wherein the first electrode connection member includes:
first connection portions having a size corresponding to the first electrode holes and respectively fitted into the first electrode holes to contact the first electrode terminals;
a conductor pattern configured to electrically connect the first connection portions; and
a first terminal portion protruding on the conductor pattern to a same height as the rod-shaped second terminal portion.

9. A battery module, comprising a plurality of cylindrical battery cell assemblies defined in claim 8.

10. The battery module according to claim 9, wherein the first electrode connection member of each cylindrical battery cell assemblies has a first terminal portion protruding to a same height as the rod-shaped second terminal portion, and
wherein the cylindrical battery cell assemblies are arranged in a triangular form when being viewed from above and closely arranged successively so that neighboring cylindrical battery cell assemblies are in a reversed form.

11. The battery module according to claim 10, further comprising:
an insulation plate having insert holes formed at predetermined positions so that the first terminal portions and the rod-shaped second terminal portions are inserted therein, the insulation plate being configured to cover an upper portion of the cylindrical cell assemblies; and
bus bars configured to selectively connect the first terminal portions and the rod-shaped second terminal portions.

12. The battery module according to claim 11, further comprising:
a heatsink located at a lower portion of the cylindrical battery cell assemblies to absorb heat of the plurality of cylindrical battery cells; and
a heat dissipation pad interposed between the cylindrical battery cell assemblies and the heatsink,
wherein the heat dissipation pad has an engagement portion provided at an upper surface thereof to be engaged with a bottom portion of the cylindrical battery cell assembly.

13. A battery pack, comprising at least one battery module defined in claim 9.

14. The cylindrical battery cell assembly according to claim 1, wherein the second connection portion is a triangular shape.

15. The cylindrical battery cell assembly according to claim 14, wherein a first cylindrical battery cell of the plurality of cylindrical battery cells is located at a first apex of the second connection portion, and
wherein the rod-shaped second terminal portion is between the first apex and a side of the second connection portion opposite the first apex.

16. The cylindrical battery cell assembly according to claim 14, wherein the unit cell body covers are provided so that at least three unit cell body covers are integrated, the at least three unit cell bodies being at a first apex of the second connection portion, and
wherein the rod-shaped second terminal portion is in a middle of the at least three unit cell body covers.

* * * * *